(12) United States Patent
Suk et al.

(10) Patent No.: US 11,487,845 B2
(45) Date of Patent: Nov. 1, 2022

(54) CONVOLUTIONAL OPERATION DEVICE WITH DIMENSIONAL CONVERSION

(71) Applicant: ELECTRONICS AND TELECOMMUNICATIONS RESEARCH INSTITUTE, Daejeon (KR)

(72) Inventors: Jung Hee Suk, Daejeon (KR); Chun-Gi Lyuh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 384 days.

(21) Appl. No.: 16/682,011

(22) Filed: Nov. 13, 2019

(65) Prior Publication Data
US 2020/0167405 A1 May 28, 2020

(30) Foreign Application Priority Data

Nov. 28, 2018 (KR) .................. 10-2018-0149745
May 9, 2019 (KR) .................. 10-2019-0054411

(51) Int. Cl.
*G06F 17/15* (2006.01)
*G06N 3/06* (2006.01)

(52) U.S. Cl.
CPC ............. *G06F 17/153* (2013.01); *G06N 3/06* (2013.01)

(58) Field of Classification Search
CPC ...... G06F 17/15; G06F 17/153; G06F 9/3893; G06F 17/16; G06F 15/8046; G06N 3/04; G06N 3/063; G06N 3/08; G06N 3/0454
See application file for complete search history.

(56) References Cited

U.S. PATENT DOCUMENTS

| | | | |
|---|---|---|---|
| 9,971,540 B2 | 5/2018 | Herrero Abellanas et al. | |
| 2011/0239032 A1* | 9/2011 | Kato | ................... G06T 1/00 713/500 |
| 2016/0267111 A1* | 9/2016 | Shoaib | ................... G06T 1/20 |
| 2018/0047389 A1 | 2/2018 | Song et al. | |

(Continued)

FOREIGN PATENT DOCUMENTS

| | | |
|---|---|---|
| KR | 10-2017-0099848 A | 9/2017 |
| KR | 10-2018-0073118 A | 7/2018 |
| KR | 10-2018-0773314 A | 7/2018 |

*Primary Examiner* — Jyoti Mehta
*Assistant Examiner* — Huy Duong
(74) *Attorney, Agent, or Firm* — LRK Patent Law Firm (57) ABSTRACT

A convolutional operation device for performing convolutional neural network processing includes an input sharing network including first and second input feature map registers configured to shift each input feature map, which is inputted in row units, in a row or column direction and output the shifted input feature map and arranged in rows and columns, a first MAC array connected to the first input feature map registers, an input feature map switching network configured to select one of the first and second input feature map registers, a second MAC array connected to one selected by the input feature map switching network among the first and second input feature map registers, and an output shift network configured to shift the output feature map from the first MAC array and the second MAC array to transmit the shifted output feature map to an output memory.

12 Claims, 7 Drawing Sheets

(56) References Cited

U.S. PATENT DOCUMENTS

| | | |
|---|---|---|
| 2018/0181838 A1 | 6/2018 | Yang |
| 2018/0181858 A1 | 6/2018 | Son et al. |
| 2018/0189643 A1 | 7/2018 | Kim et al. |
| 2018/0300138 A1* | 10/2018 | Pineda de Gyvez . G06F 3/0488 |
| 2020/0097442 A1* | 3/2020 | Jacob (Yaakov) .. G06F 9/30032 |
| 2021/0004701 A1* | 1/2021 | Shibata ................ G06N 3/0454 |

* cited by examiner

CONVOLUTIONAL OPERATION DEVICE WITH DIMENSIONAL CONVERSION

CROSS-REFERENCE TO RELATED APPLICATIONS

This U.S. non-provisional patent application claims priority under 35 U.S.C. § 119 of Korean Patent Application Nos. 10-2018-0149745, filed on Nov. 28, 2018, and 10-2019-0054411, filed on May 9, 2019, the entire contents of which are hereby incorporated by reference.

BACKGROUND

1. Field of the Invention

The present disclosure herein relates to a neural network system, and more particularly, to a device for efficiently parallelizing a convolutional operation of a convolutional neural network used in an image-based deep neural network.

2. Description of Related Art

Artificial Intelligence (AI) semiconductor design technology, which mimics the human brain, has been developed for decades. However, AI semiconductor design technology has been stagnant due to the limited amount of computation of silicon-based semiconductors. Neural networks, which model neurons' neurotransmission through the process of learning the weight of input values have not been in the spotlight due to the limitations of semiconductor technology. However, with the recent miniaturization and advancement of semiconductor processes, AI semiconductor design technology and neural network models have been in the spotlight again.

AI semiconductors may use a large amount of input information to implement thoughts, inferences, behaviors, and operations optimized for specific services. As the concepts of a multi-layer perceptron (MLP) and a neural network (MLP) circuit are introduced to the AI semiconductor technology, the application fields of the AI technology are diversified and variously changed.

Recently, various deep learning technologies have emerged. In the deep learning technology, an image-using field uses a convolutional neural network (CNN). The CNN is one of deep neural networks including a plurality of convolution layers and a pooling layer for reducing the size of a feature map. Each convolutional layer receives M input feature maps (IFMs) and generates N output feature maps (OFMs). The number of layers in these CNNs ranges from tens to hundreds and is on the rise. Accordingly, various parallel processing hardware technologies are being developed to process CNNs at high speed.

SUMMARY

The present disclosure provides a device and method for increasing the utilization rate of Processing Elements (PEs) to maximize a parallel operation efficiency through a method of changing the dimensional structure of a convolution operation in consideration of the dimensional characteristics of each convolutional layer that constitutes a deep convolutional neural network.

An embodiment of the inventive concept provides a convolutional operation device that performs convolutional neural network processing, the device including: an input sharing network comprising first input feature map registers and second input feature map registers configured to sequentially shift each input feature map, which is inputted in row units, in a row direction or a column direction and output the shifted input feature map and arranged in rows and columns; a first MAC array connected to the first input feature map registers; an input feature map switching network configured to select any one of the first input feature map registers and the second input feature map registers; a second MAC array connected to any one selected by the input feature map switching network among the first input feature map registers and the second input feature map registers; and an output shift network configured to shift the output feature map outputted from the first MAC array and the second MAC array to transmit the shifted output feature map to an output memory.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In the following, embodiments of the inventive concept will be described in detail so that those skilled in the art easily carry out the inventive concept.

Figure 1:
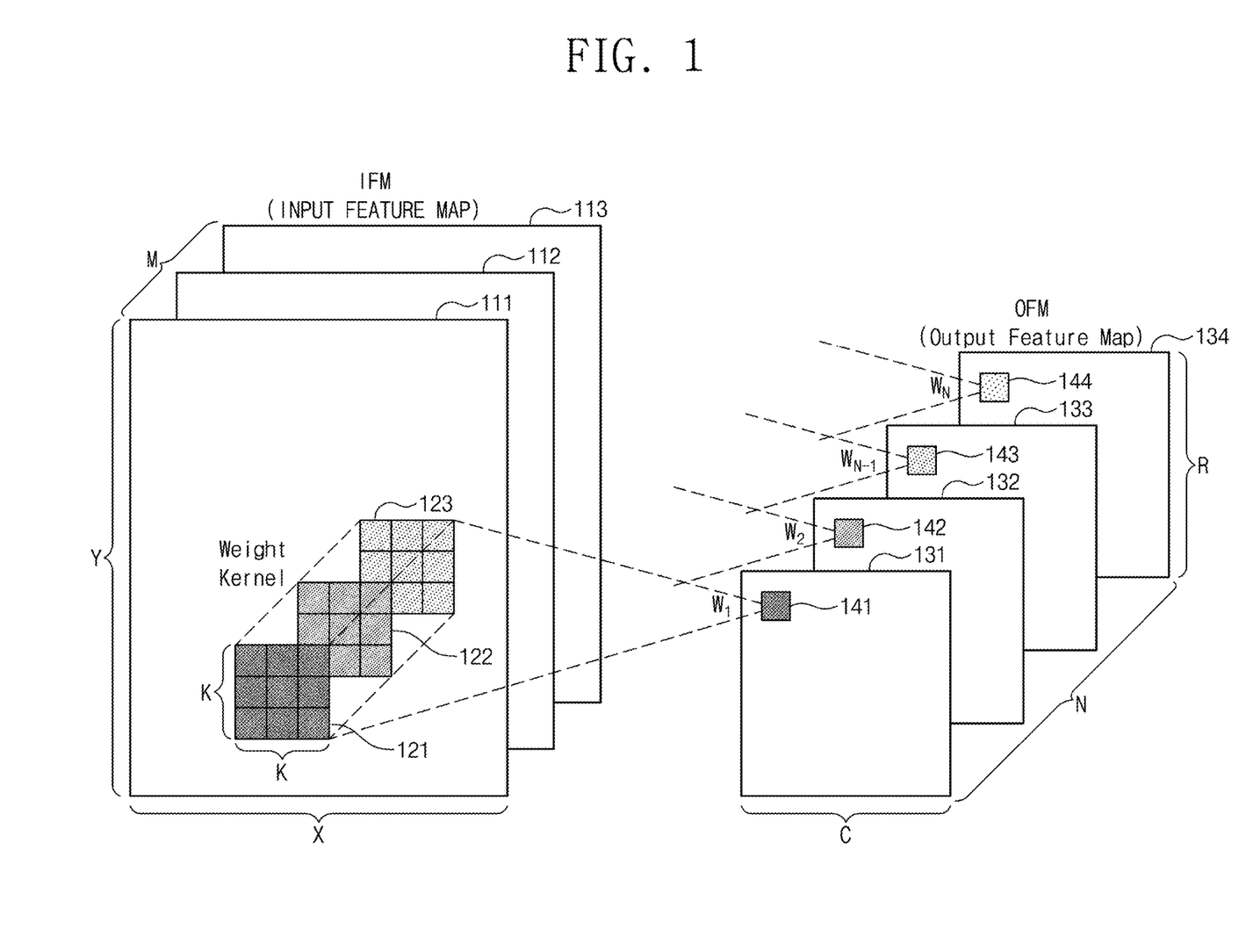
FIG. 1 is a view briefly showing an example of a convolution operation performed in a deep neural network according to an embodiment of the inventive concept.

FIG. 1 is a view briefly showing an example of a convolution operation performed in a deep neural network according to an embodiment of the inventive concept. Referring to FIG. 1, input feature maps 111, 112, and 113 are generated as output feature maps 131, 132, 133, and 134 by a convolution operation.

The input feature map 111 is converted into the output feature map 131 in the form of an array by convolution operations with the weight kernels 121, 122, 123. That is, when the values of elements generated through convolution processing of the overlapped position between the input feature map 111 and the weight kernels 121, 122, and 123 are added, a feature value corresponding to one point 141 of the output feature map 131 is generated. If the convolution operation is performed while shifting the weight kernels 121, 122, and 123 with respect to all positions of the input feature map 111, one output feature map 131 may be generated. If applying this convolution operation to M input feature maps 111, 112, and 113 of X×Y size, N output feature maps 154 of C×R size may be generated.

The convolution operation described above corresponds to one convolution layer. The deep convolutional neural network is a neural network with several to hundreds of convolutional layers. An output feature map OFM is generated by computing the first convolution layer from the input image, and the output feature map OFM generated in this way becomes the input feature map IFM of the next convolutional layer. The convolution operation has an operation of repeating this process until all layers are completed.

Figure 2:
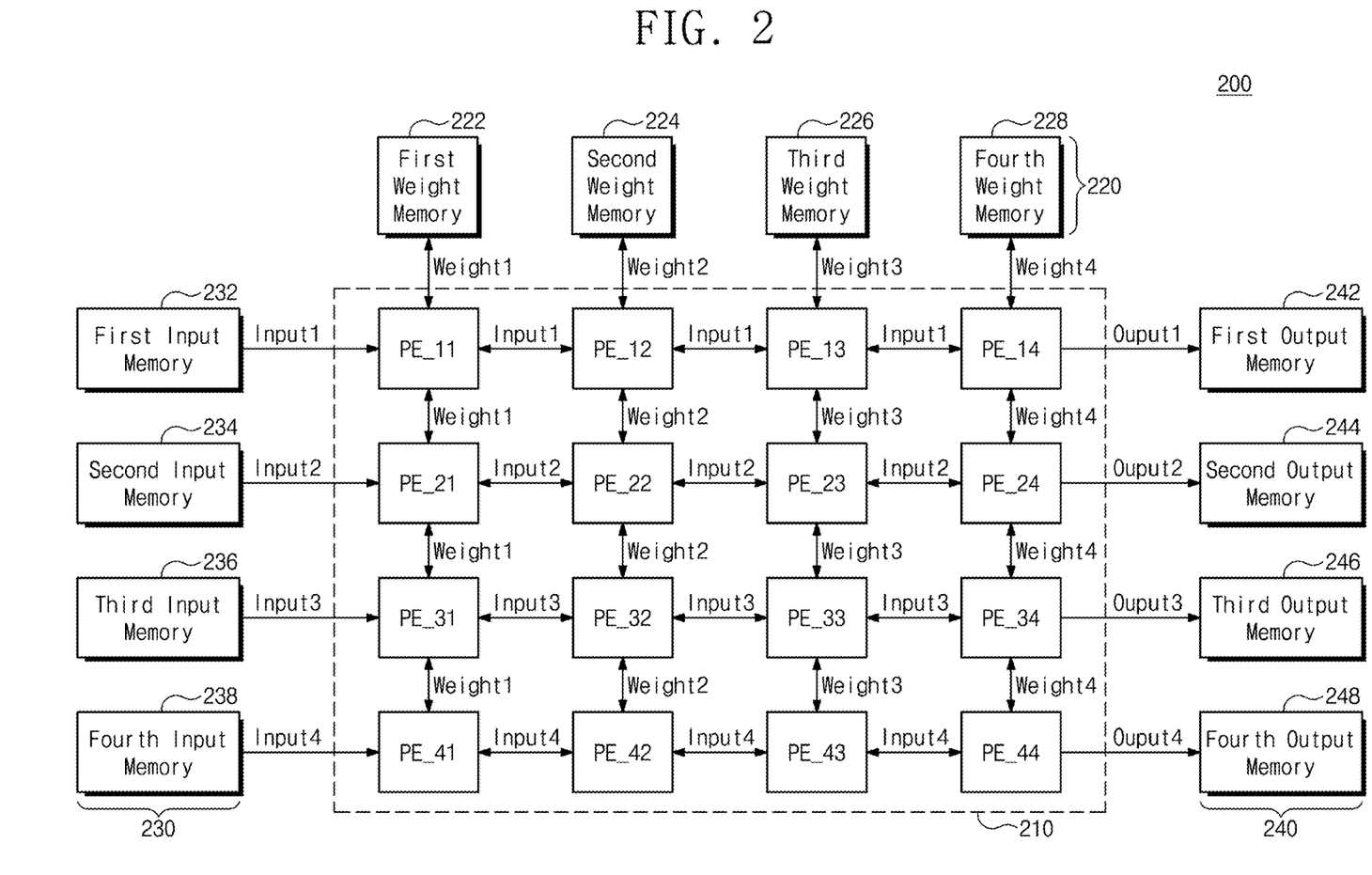
FIG. 2 is a block diagram illustrating a hardware structure of a neural network system for parallel processing of the convolution operation of FIG. 1 at high speed.

FIG. 2 is a block diagram illustrating a hardware structure of a neural network system for parallel processing of the convolution operation of FIG. 1 at high speed. Referring to FIG. 2, the neural network system 200 illustratively includes a processing element array 210 for processing input data provided from the input memory 230. The processing element array 210 processes the input data with the weight kernel provided from the weight memory 220 through a convolution operation and then, transmits the processed input data to the output memory 240.

The processing element array 210 may be configured in a two-dimensional systolic array structure, and it is assumed in the drawing that processing elements PEs of 4×4 size are included. Each of the processing elements PE_11 to PE_44 may perform a convolution operation by using an input feature from any one of the input memories 230 and a kernel weight provided from any one of the weight memories 220.

The weight memory 220 provides parameters necessary for composite product operation, bias addition, Relu, Pooling, and the like performed in the processing element array 210. In particular, the weight memory 220 may provide kernel weights weight1 to weight4 required for the convolution operation in units of columns of the processing element array 210. The weight memory 220 may include a plurality of weight memories 222, 224, 226, and 228 corresponding to column units of the processing element array 210.

The input data provided from the input memory 230 to the processing element array 210 may be image data, for example. The data values of the input data are loaded into the input memory 230. The size of the input memory 230 may vary depending on the size of the kernel for the composite product (or convolution) operation. For example, if the kernel size is K×K, the input memory 230 should be loaded with input data of sufficient size to sequentially perform a composite product operation with the kernel by the processing element array 210. The input memory 230 may include a plurality of input memories 232, 234, 236, 238 that provide input features to respective rows of the processing element array 210.

The output memory 240 is loaded with the results of convolution operations or Pooling performed by the processing element array 210. The result value loaded into the output memory 240 is updated according to the execution result of each convolution loop by the plurality of kernels. Thereafter, the value loaded in the output memory 240 is returned to the input memory 230 and used as an input value of another convolution operation. The output memory 240 may include a plurality of output memories 242, 244, 246, 248 that receive output features in respective rows of the processing element array 210.

The process of the convolution operation in the neural network system 200 should be continuously performed in synchronization with the cycle. In this structure, the inputted input feature map IFM and the partial sum that is an output of a kernel weight and a composite product must be transmitted to the memory every cycle. Therefore, it is difficult to control a convolution operation in the neural network system 200. In addition, the processing element array 210 configured in the form of a two-dimensional array must be changed to an efficient processing structure in correspondence to the dimensional characteristics M, Y, X, N, R, and C (see FIG. 1) of each convolutional layer.

Figure 3:
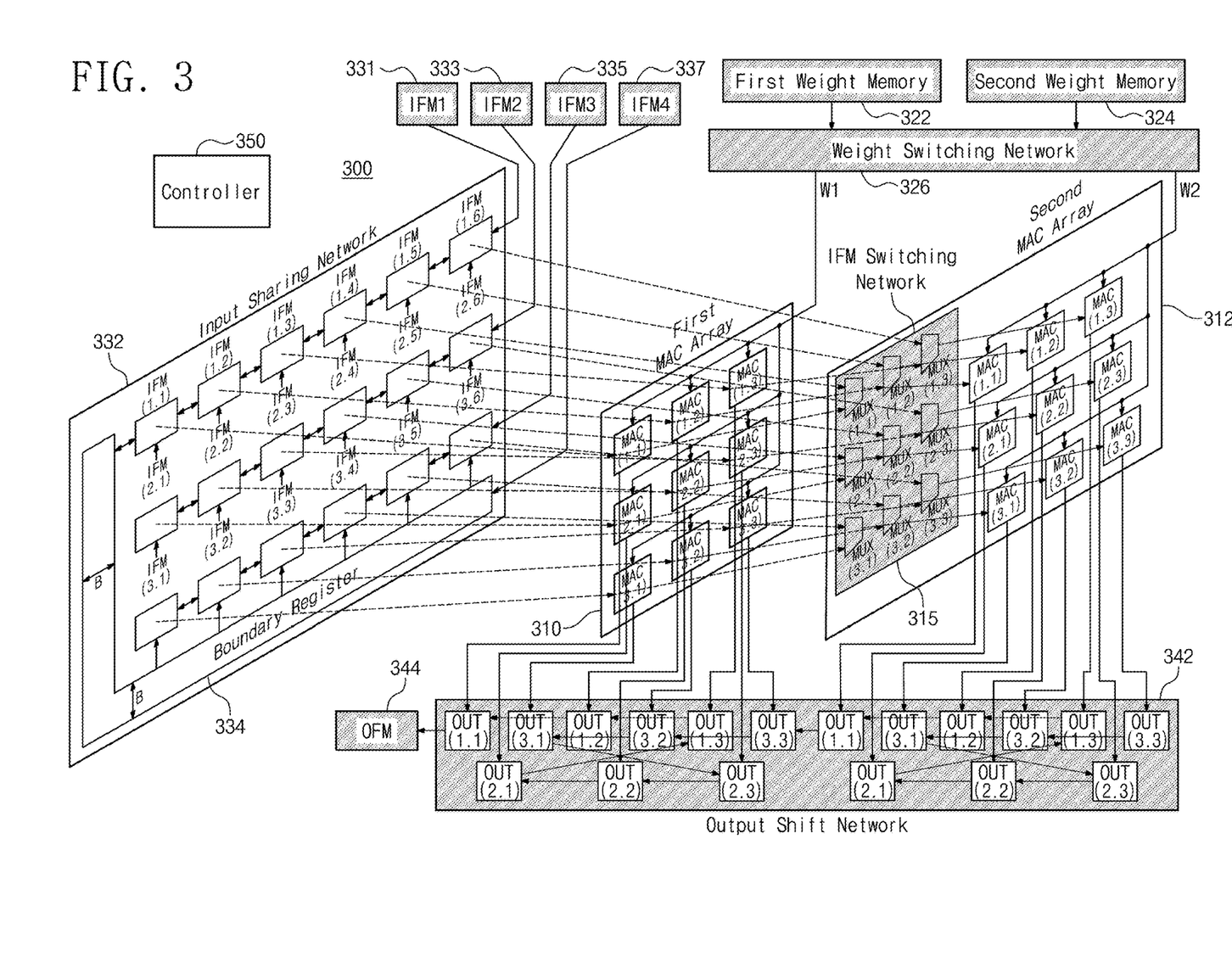
FIG. 3 is a block diagram exemplarily illustrating a convolutional operation device with dimensional conversion of the inventive concept.

FIG. 3 is a block diagram exemplarily illustrating a convolutional operation device with dimensional conversion of the inventive concept. Referring to FIG. 3, a convolutional operation device 300 includes two-dimensional Multiply-Accumulator (MAC) arrays 310 and 312, an IFM switching network 315, weight memories 322 and 324, a weight switching network 326, input feature map buffers 331, 333, 335, 337, an input sharing network 332, an output shift network 342, an output feature map buffer 344, and a controller 350.

Each of the MAC arrays 310 and 312 will include a plurality of MAC cores arranged in two dimensions, as in the processing element array 210 described above. Here, although two MAC arrays 310 and 312 are shown by way of example, the number of MAC arrays may be extended to the number N (see FIG. 1) of dimensions of the output feature map. A structure in which each of the MAC arrays 310 and 312 includes MAC cores having 3×3 size will be described by way of example.

The first MAC array 310 includes a plurality of MAC cores MAC(i, j) (i and j=1, 2, 3). The first MAC array 310 performs a convolution operation using the first weight W1 provided from the weight switching network 326 and an input value provided from the IFM registers IFM(i, j) (i and j=1, 2, 3) of the input sharing network 332. The second MAC array 312 may include a plurality of MAC cores MAC(i, j) (i and j=1, 2, 3) and an IFM switching network 315. The second MAC array 312 performs a convolution operation using the second weight W2 provided from the weight switching network 326 and an input value selected from the IFM switching network 315.

The IFM switching network 315 may provide the input features provided from the IFM registers IFM(i, j) (i and j=1, 2, 3) or the IFM registers IFM(i, j) (i=(1, 2, 3), j=(4, 5, 6)) to the second MAC array 312 according to the mapping condition.

The weight memories 322 and 324 and the weight switching network 326 receive the weight kernel for the convolution operation and transmit the weight kernel to the MAC arrays 310 and 312. The first weight W1 may be provided through the first weight memory 322, and the second weight W2 may be provided through the second weight memory 324. The weight switching network 326 transmits the first weight W1 and the second weight W2 to the first MAC array 310 and the second MAC array 312, respectively.

The input sharing network 332 is configured with a network of two-dimensional IFM registers IFM(i, j) (i and j=1, 2, 3) capable of transmitting data in left, right and up directions. The number of rows and columns of the input sharing network 332 may be determined by the number and size of the two-dimensional MAC arrays 310 and 312 and the size K of the weight kernel. When the size of the weight kernel is K, the boundary register 334 additionally requires (K−1) rows and columns.

The number of rows of the input sharing network 332 is the sum of the size of the MAC arrays 310 and 312 and the number of rows of the boundary register 334. That is, when the size K of the weight kernel is 3, the number of rows of the input sharing network 332 becomes (3+2), which is five. The number of columns of the input sharing network 332 corresponds to {the number of dimensions of the MAC arrays 310 and 312}×{the size of the MAC arrays 310 and 312}+{the number of columns of the boundary register 334}. If the size K of the weight kernel is 3 and the number of dimensions of the MAC arrays 310 and 312 arranged in two dimensions is 2 as shown in the drawing, the number of columns of the input sharing network 332 will be 3×2+2, which is eight.

Each of the MACs of the two-dimensional MAC arrays 310 and 312 described above has a separate output register. Each of the MACs stores a partial sum in an output register and accumulates the partial sum in the output register during the repetition of the convolution operation. The output register of each of the MACs is mapped one-to-one with a register of the output shift network 342. The output of the final output feature map OFM is stored in the output register of each of the MACs of the MAC arrays 310 and 312 and then starts a subsequent convolution operation. The reason for using the separate output shift network 342 is to read the final generated output feature map OFM at the same time as the convolution operation is performed.

The registers of the output shift network 342 OUT(i, j) (i=(1, 2, 3), j=(1, 2, 3)) are connected in a zigzag chain as shown in the drawing, and transmit the stored output feature map OFM to the output feature map buffer 344 in a sequential or hopping fashion. The arrangement of the registers of the output shift network 342 may depend on the dimension and size of the MAC arrays 310 and 312.

The output of the IFM registers IFM (i, j) (i=(1, 2, 3), j=(1, 2, 3, 4, 5, 6)) of the input sharing network 332 described above is MAC is mapped to the input of each of the MAC arrays 310 and 312. The method of mapping depends on how to deal with the dimensions of the two-dimensional MAC arrays 310 and 312. As shown in the drawing, when the MAC arrays 310 and 312 are configured in two, two mapping methods may be used.

The first mapping method is a method of mapping each of the two MAC arrays 310 and 312 to independently compute the (N−2) and (N−1) dimensions among the N dimension of the output feature map OFM. The output of each MAC of the first MAC array 310 corresponds to a pixel in the (N−2) dimension of the output feature map OFM. The output of each MAC of the second MAC array 312 corresponds to a pixel in the (N−1) dimension of the output feature map OFM. In this case, the weight kernel values of the (N−2) dimension inputted to each of the MACs of the first MAC array 310 are all shared by the same value W1. Similarly, the weight kernel values of the (N−1) dimension inputted to the MACs of the second MAC array 312 are also all shared by the same value W2.

In addition, the IFM input port of each of the MACs of the first MAC array 310 is mapped one-to-one with the register output in the same coordinates in the input sharing network 332. In the same manner, the IFM input port of each of the MACs of the second MAC array 312 is mapped one-to-one with the register output at the same coordinates in the input sharing network 332. That is, the IFM input port of each MAC of the first MAC array 310 and the IFM input port of each MAC of the second MAC array 312 are connected to a register output arranged at the same coordinates of the input sharing network 332.

The second mapping method is a method of integrating two MAC arrays 310 and 312 in the same dimension and mapping the integrated one to the (N−2) dimension, which is one of the N dimensions of the output feature map OFM. The output of each of the MACs of the first MAC array 310 and the output of each of the MACs of the second MAC array 312 correspond to pixels in the (N−2) dimension of the output feature map OFM. In this case, the weight kernel values in the (N−2) dimension of the output feature map OFM inputted to each MAC of the first MAC array 310 and each MAC of the second MAC array 312 are identically shared. Then, the IFM input port of each of the MACs of the first MAC array 310 is mapped one-to-one with the register output at the same coordinates in the input sharing network 332. However, the IFM input port of each MAC of the second MAC array 312 are mapped one-to-one with a register output corresponding to the coordinate shifted by the maximum array size (e.g., 3) in the input sharing network 332. In such a manner, the IFM switching network 315 may be used to map the IFM input port of the second MAC array 312 to the coordinates of the input sharing network 332 at the shifted location.

As described above, according to the dimensional configuration of the MAC arrays 310 and 312 arranged in two dimensions, a mapping method between the IFM input port of each MAC and the register output port of the input sharing network 332 is provided. In addition, a mapping method between each MAC and an input port of a weight kernel according to the dimensional configuration of the MAC arrays 310 and 312 arranged in two dimensions is provided.

When the IFM input path and weight kernel input path are determined, the input feature map IFM must be inputted separately by each row of the input sharing network 332, in order for convolution operations. In the embodiment shown, since the number of rows is five, the input feature map IMF is divided into five and is inputted. In relation to the input feature map IFM divided into five and inputted, input data will be transmitted identically in the shift direction (left→left→up→right→right→up→left→left) by each row through the input sharing network 332. As each register of the input sharing network 332 transmits an input feature map IFM divided in the shift direction (left→left→up→right→up→left→left) to an adjacent register, it forms an array of input feature maps IFMs required for convolution operations using a weight kernel of 3×3 size.

In accordance with the cycle in which the input feature map IMF is transmitted, the value of the weight kernel will also be sequentially inputted to the MAC arrays 310 and 312. In such a method, each MAC in the two MAC arrays 310 and 312 generates a partial sum corresponding to one pixel of the output feature map OFM. In such a way, as each of the input feature maps of X×Y×M size of FIG. 1 is stridden in the IFM switching network 315, the output feature map OFM, which is the result of the last convolution operation, is generated from the MAC arrays 310 and 312.

Each of the MACs of the MAC arrays 310 and 312 arranged in two dimensions has a separate output register. Thus, each of the MACs stores a partial sum in the provided output register and accumulates the partial sum while the operation of each convolutional layer is repeated. The output register of each of the MACs is mapped one-to-one with a register of the output shift network 342. The value of the final output feature map OFM outputted from each of the MACs of the MAC arrays 310 and 312 is stored in an output register and may then be used for the computation of the next convolutional layer. The reason why each of the MACs has a separate output register is to read the last generated output feature map OFM at the same time as the convolution operation is performed. The registers OUT(x, y) (x=(1, 2, 3), y=(1, 2, 3)) of the output shift network 342 are connected in a zigzag chain as in the structure shown. Then, the registers OUT(x, y) transmits the stored output feature map OFM to the OFM buffer 344 in a sequential or hopping manner.

The controller 350 may control overall operations of configurations included in the convolutional operation device 300. For example, the controller 350 may control the paths of the input feature map IFM and the output feature map OFM according to the set sequence.

In the above, the configuration and function of the convolutional operation device 300 of the inventive concept has been exemplarily described. Through the convolutional operation device 300 of the inventive concept, the utilization rate of MACs may be increased through dimension setting optimized for the dimension characteristics of each convolutional layer.

Figure 4:
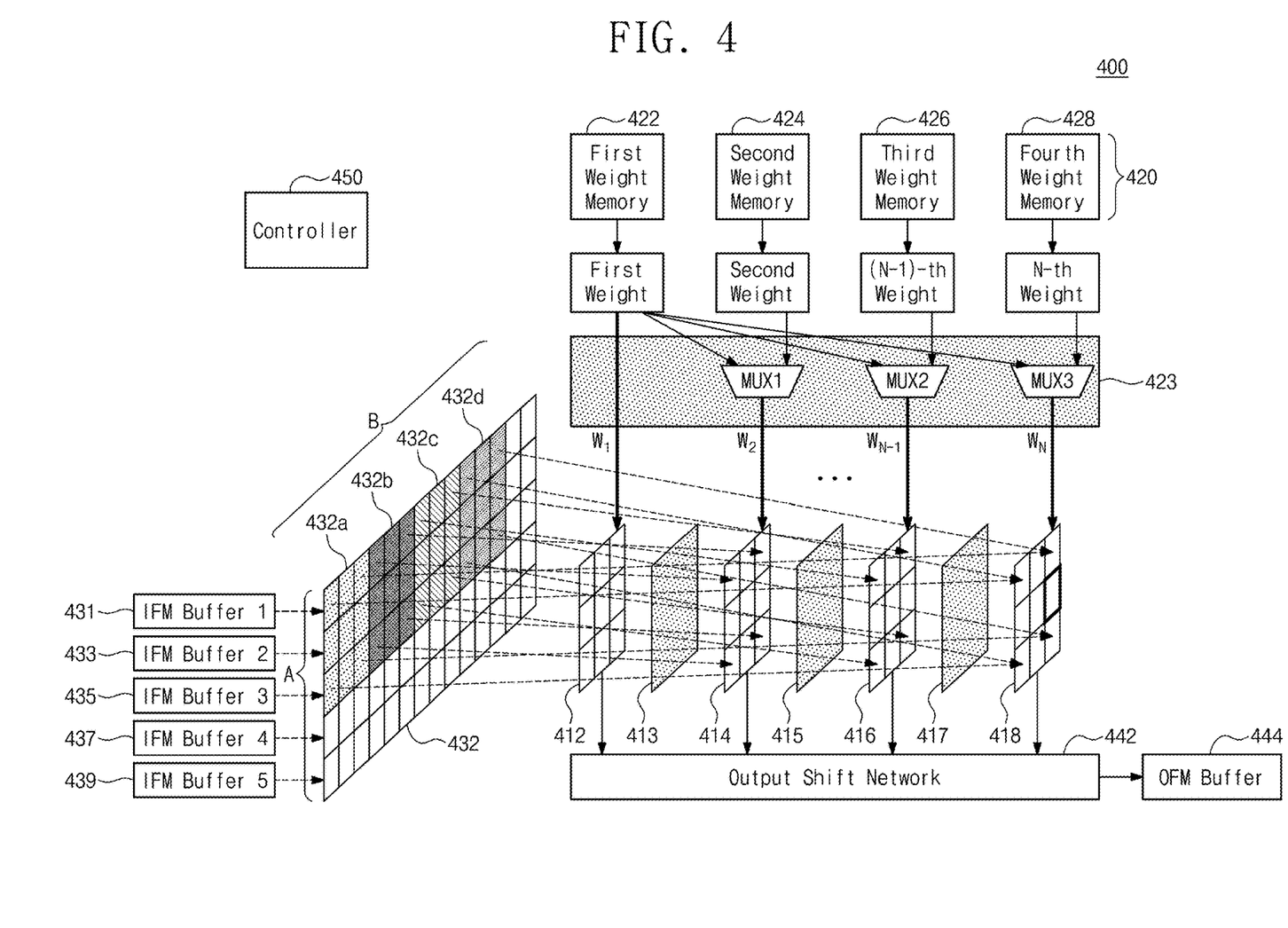
FIG. 4 is a block diagram illustrating a structure of a convolutional operation device according to another embodiment of the inventive concept.

FIG. 4 is a block diagram illustrating a structure of a convolutional operation device according to another embodiment of the inventive concept. Referring to FIG. 4, the convolutional operation device 400 may include N MAC arrays 412, 414, 416, and 418, IFM switching networks 413, 415, and 417, weight memories 422, 424, 426, and 428, a weight switching network 423, IFM buffers 431, 433, 435, 437, and 439, an input sharing network 432, an output shift network 442, an output feature map buffer 444, and a controller 450.

The N MAC arrays 412, 414, 416, and 418 will each include a plurality of MAC cores arranged in two dimensions. Here, each of the N MAC arrays 412, 414, 416, and 418 corresponds to the number N of dimensions of the output feature map OFM. That is, each of the MAC arrays 412, 414, 416, and 418 may each correspond to one output feature map OFM. Each of the MAC arrays 412, 414, 416, and 418 is shown with a structure including 3×3 type MAC cores, but the inventive concept is not limited to the 3×3 type.

The first MAC array 412 may include a plurality of MAC cores provided in a 3×3 array. The first MAC array 412 performs a convolution operation using the first weight W1 provided from the weight switching network 423 and an input value provided from the IFM registers 432a of the input sharing network 432.

The second MAC array 414 may include a plurality of MAC cores provided in a 3×3 array. The second MAC array 414 may be mapped one-to-one with any one of the IFM registers 432a and the IFM registers 432b through the IFM switching network 413. The second MAC array 414 may perform a convolution operation using the second weight W2 provided from the weight switching network 423 and an input value selected from the IFM switching network 413.

The third MAC array 416 may include a plurality of MAC cores provided in a 3×3 array. The third MAC array 416 may be mapped one-to-one with any one of the IFM registers 432a and the IFM registers 432c through the IFM switching network 415. The third MAC array 414 may perform a convolution operation using the (N−1)-th weight WN-1 provided from the weight switching network 423 and an input value selected from the IFM switching network 415.

The fourth MAC array 418 may be mapped one-to-one with any one of the IFM registers 432a and the IFM registers 432d through the IFM switching network 417. The fourth MAC array 418 may perform a convolution operation using the N-th weight WN provided from the weight switching network 423 and an input value selected from the IFM switching network 417.

The weight memories 422, 424, 426, and 428 and the weight switching network 423 receive the weight kernel for the convolution operation and transmit the weight kernel to the MAC arrays 412, 414, 416, and 418. For example, the first weight W1 may be provided through the first weight memory 422, and the second weight W2 may be provided through the second weight memory 424. The (N−1)-th weight WN-1 may be provided through the (N−1)-th weight memory 426, and the N-th weight WN may be provided through the N-th weight memory 428. The weight switching network 423 transmits the weights W1 to WN to the MAC arrays 412, 414, 416, and 418, respectively.

The input sharing network 432 is configured with a network of two-dimensional IFM registers capable of transmitting data in left, right, and up directions. The number of rows and columns of the input sharing network 432 may be determined by the number and size of the two-dimensional MAC arrays 412, 414, 416, and 418 and the size K of the weight kernel. When assuming the weight kernel size is 3, in relation to the number of rows of the input sharing network 432 shown, two rows and columns corresponding to the boundary register in addition to the IFM registers 432a to 432d may be added.

The number of rows of the input sharing network 432 is the sum of the size of the MAC arrays 412, 414, 416, and 418 and the number of rows of the boundary register (not shown). The number of rows in the input sharing network 432 becomes (3+2), which is five. And, the number of columns of the input sharing network 432 corresponds to {the number of dimensions (i.e., 4) of the MAC arrays 412, 414, 416, 418}×{the size (i.e., 3) of the MAC arrays 412, 414, 416, 418}+{the number of columns (i.e., 2) of the boundary register 334}='14'. If the size K of the weight kernel is 3 and the number of dimensions of the MAC arrays 310 and 312 arranged in two dimensions is 2 as shown in the drawing, the number of columns of the input sharing network 332 will be 3×2+2, which is eight.

The input sharing network 432 may transmit the input feature map IMF provided from the IFM buffers 431, 433, 435, 437, and 439 identically by each row in the shift direction (left→left→up→right→right→up→left→left). Then, the input feature map IMF is transmitted to the MAC arrays 412, 414, 416, and 418 through respective registers of the input sharing network 432.

The output feature map OFM, which is connected in a zigzag register chain of the output shift network 442 and is stored in a sequential or hopping manner, is transmitted to the output feature map buffer 444. The arrangement of the registers of the output shift network 442 may depend on the dimension and size of the MAC arrays 412, 414, 416, and 418.

Figure 5:
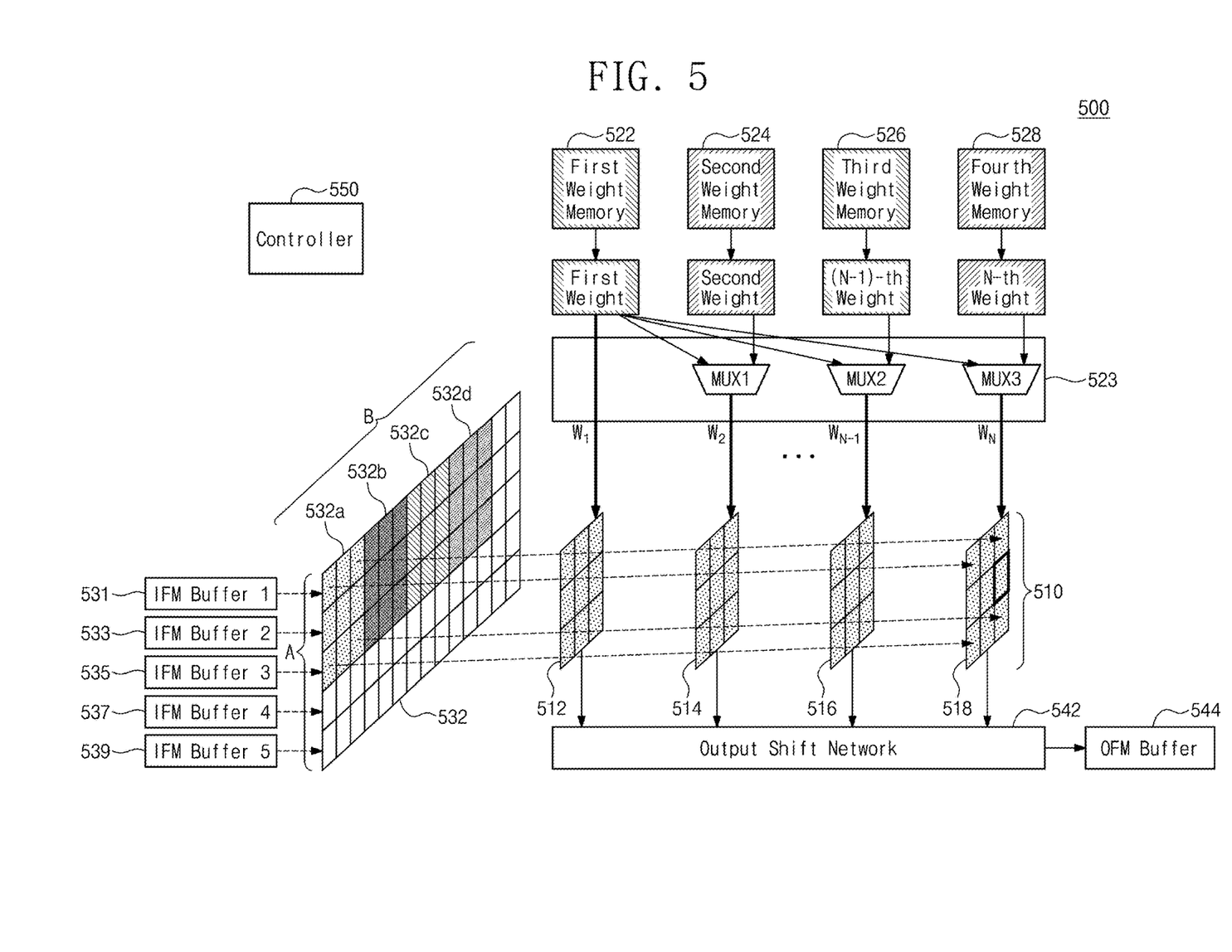
FIG. 5 is a block diagram illustrating another structure of a convolutional operation device according to an embodiment of the inventive concept.

FIG. 5 is a block diagram illustrating another structure of a convolutional operation device according to an embodiment of the inventive concept. Referring to FIG. 5, the convolutional operation device 500 may include N MAC arrays 512, 514, 516, and 518, weight memories 522, 524, 526, and 528, a weight switching network 523, IFM buffers 531, 533, 535, 537, and 539, an input sharing network 532, an output shift network 542, an output feature map buffer 544, and a controller 550. In the structure shown in FIG. 5, there are no IFM switching networks 413, 415, and 417.

The N MAC arrays 512, 514, 516, and 518 will each include a plurality of MAC cores arranged in two dimensions. Here, each of the N MAC arrays 512, 514, 516, and 518 corresponds to the number N of dimensions of the output feature map OFM. That is, each of the MAC arrays 412, 414, 416, and 418 may each correspond to one output feature map OFM. Each of the MAC arrays 512, 514, 516, 518 is shown with a structure including 3×3 type MAC cores, but the inventive concept is not limited to the 3×3 type.

The first MAC array 512 may include a plurality of MAC cores provided in a 3×3 array. The first MAC array 512 performs a convolution operation using the first weight W1 provided from the weight switching network 523 and an input value provided from the IFM registers 532a of the input sharing network 532.

The second to fourth MAC arrays 514, 516, and 518 are mapped to the IFM registers 532a in substantially the same correspondence as the first MAC array 512. The second to fourth MAC arrays 514, 516, and 518 are commonly mapped to the IFM registers 532a, although the kernel weights W1 to WN-1 provided from the weight switching network 523 are different. Thus, as the input feature map IMF inputted through the IFM buffers 531, 533, 535, 537, and 539 is shifted on the weight switching network 523, the input feature map IMF is commonly provided to the MAC arrays 512, 514, 516, and 518.

The number of rows and columns of the input sharing network 532 is the same as that of the structure of FIG. 4. The input sharing network 532 may transmit the input feature map IMF provided from the IFM buffers 531, 533, 535, 537, and 539 identically by each row in the shift direction (left→left→up→right→right→up→left→left). Then, the input feature map IFM present in the IFM registers 532a of the input sharing network 532 is commonly transmitted to the MAC arrays 512, 514, 516, and 518.

The output feature map OFM, which is connected in a zigzag register chain of the output shift network 542 and is stored in a sequential or hopping manner, is transmitted to the output feature map buffer 544. The arrangement of the registers of the output shift network 542 may depend on the dimension and size of the MAC arrays 512, 514, 516, and 518. In this case, when the dimension N of the output feature map OFM is large and the sizes R and C of the output feature map OFM are small, parallel processing efficiency may be increased.

Figure 6:
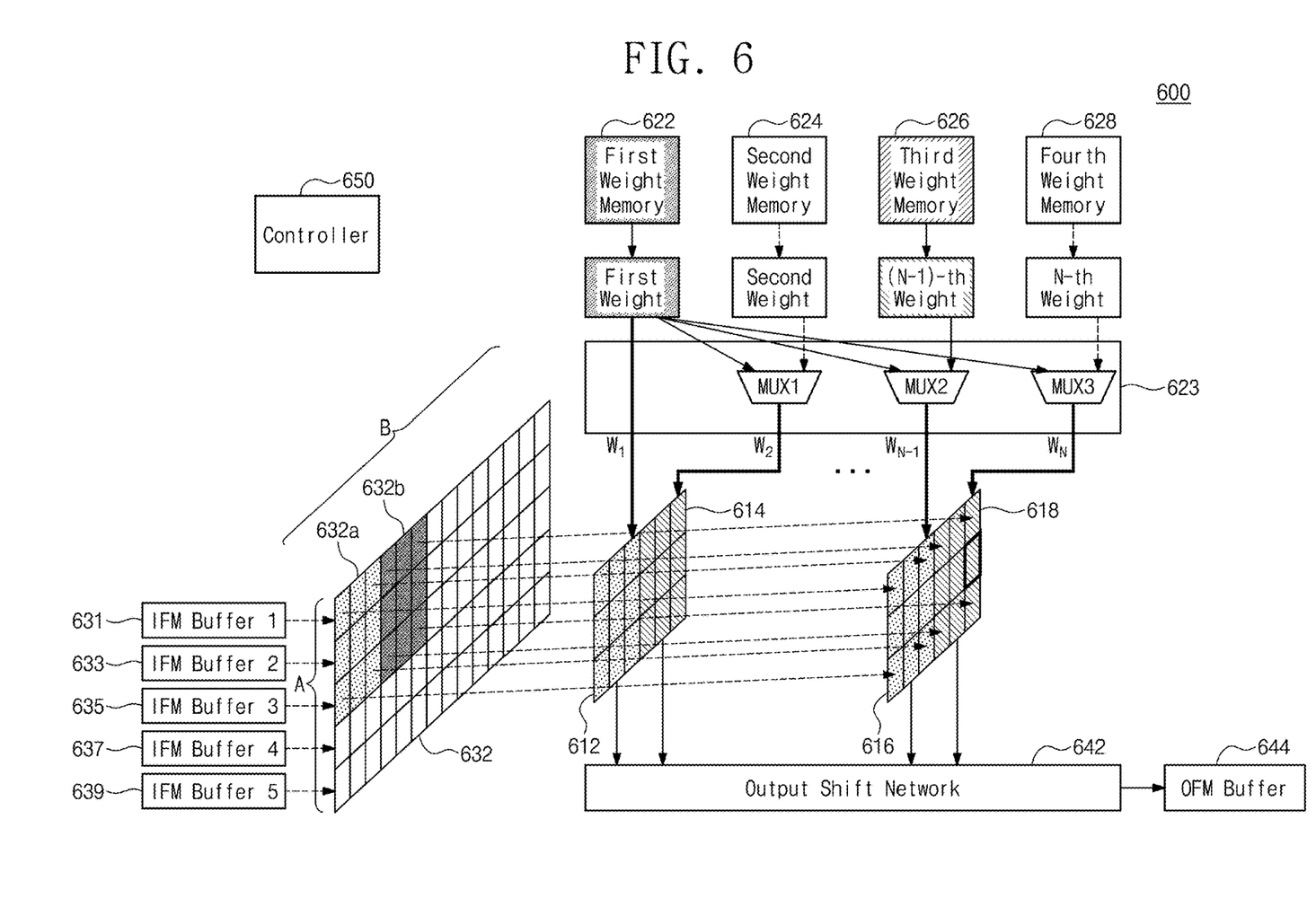
FIG. 6 is a block diagram illustrating another structure of a convolutional operation device according to an embodiment of the inventive concept.

FIG. 6 is a block diagram illustrating another structure of a convolutional operation device according to an embodiment of the inventive concept. Referring to FIG. 6, the convolutional operation device 600 may include N MAC arrays 612, 614, 616, and 618, weight memories 622, 624, 626, and 628, a weight switching network 623, IFM buffers 631, 633, 635, 637, and 639, an input sharing network 632, an output shift network 642, an output feature map buffer 644, and a controller 650. In the structure of the convolutional operation device 600 shown in FIG. 6, unlike the FIG. 4, the IFM switching network does not exist separately.

The N MAC arrays 612, 614, 616, and 618 will each include a plurality of MAC cores arranged in two dimensions. Here, each of the N MAC arrays 612, 614, 616, 618 is mapped to a half dimension N/2 of the output feature map OFM. That is, two MAC arrays 612 and 614 may be mapped to one output feature map OFM, and two MAC arrays 616 and 618 may be mapped to another output feature map OFM.

In the case of the above-described mapping, since the weight kernel needs only values corresponding to the N/2 dimension, the number of weight memories may be reduced by half compared to the arrangement of FIG. 5. When storing an N/2-dimensional weight kernel in the weight memories 622, 624, 626, and 628, if the memory jumps in multiples of 2 and saves it, the number of MUX switches in the weight switching network 623 may be minimized.

The weight pairs WN and WN-1 will share the same weight kernel. The MAC arrays 612 and 616 are mapped to the IFM registers 632a, respectively. Then, the MAC arrays 614 and 618 are mapped to the IFM registers 632b, respectively. In this case, the dimension N of the output feature map OFM of the convolutional layer is small compared to that described in the embodiment of FIG. 5, and when the sizes R and C of the output feature map OFM become large, parallel processing efficiency is increased.

Figure 7:
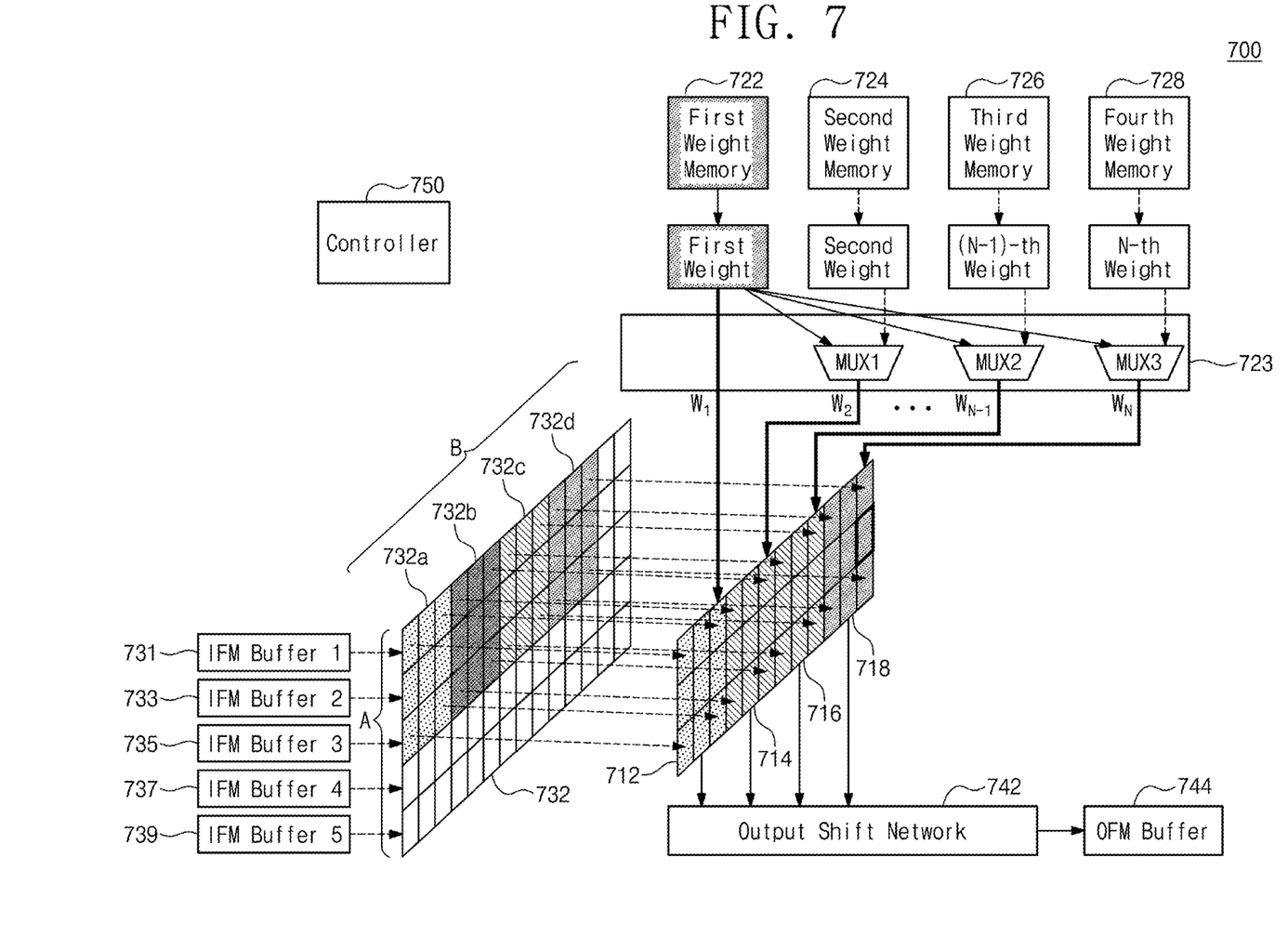
FIG. 7 is a block diagram illustrating another structure of a convolutional operation device according to an embodiment of the inventive concept.

FIG. 7 is a block diagram illustrating another structure of a convolutional operation device according to an embodiment of the inventive concept. Referring to FIG. 7, the convolutional operation device 700 may include N MAC arrays 712, 714, 716, and 718, weight memories 722, 724, 726, and 728, a weight switching network 723, IFM buffers 731, 733, 735, 737, and 739, an input sharing network 732, an output shift network 742, an output feature map buffer 744, and a controller 750.

The N MAC arrays 712, 714, 716, and 718 will each include a plurality of MAC cores arranged in two dimensions. Here, each of the N MAC arrays 712, 714, 716, 718 is mapped to one dimension of the output feature map OFM. That is, an N number of MAC arrays 712, 714, 716, and 718 are integrated with one dimension of the output feature map OFM. In this case, since only a weight kernel of one dimension is required, only one weight memory is needed. For example, only the first weight memory 722 is needed to provide a weight kernel.

In addition, the MAC arrays 712, 714, 716, and 718 may be mapped to the IFM registers 732a, 732b, 732c, and 732d, respectively. In this case, when the dimension N of the output feature map OFM of the convolutional layer is small and the sizes R and C of the output feature map OFM are large, parallel processing efficiency will increase.

According to an embodiment of the inventive concept, the convolutional layers of deep convolutional neural networks that have been recently developed have various forms. In other words, since a parallel convolutional operation device with a fixed structure and data path cannot change the computational structure for these different types of convolutional layers, some processing elements do not operate, so that this leads to a decrease in computational efficiency. The inventive concept may improve parallel processing efficiency through a convolution device and method capable of converting a dimension of a two-dimensional MAC array to be appropriate for the characteristics of a convolutional layer.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A convolutional operation device that performs convolutional neural network (CNN) processing, the convolutional operation device comprising:
   an input sharing network comprising first input feature map registers and second input feature map registers arranged in rows and columns and configured to sequentially shift each input feature map, which is inputted in row units, in a row direction or in a column direction and output the shifted input feature map;
   a first multiply-accumulator (MAC) array connected directly to the first input feature map registers;

an input feature map switching network configured to select any one of the first input feature map registers and the second input feature map registers;

a second multiply-accumulator (MAC) array connected to the one selected by the input feature map switching network among the first input feature map registers and the second input feature map registers; and an output shift network configured to shift an output feature map outputted from the first MAC array and the second MAC array and transmit the shifted output feature map to an output memory.

2. The convolutional operation device of claim 1, wherein a number of rows of the input sharing network corresponds to a sum of a number of rows of the first or second MAC array and a number obtained by subtracting 1 from a kernel size.

3. The convolutional operation device of claim 2, wherein a number of columns of the input sharing network corresponds to a value obtained by adding the number obtained by subtracting 1 from the kernel size to a product of a number of dimensions and a size of the first or second MAC array.

4. The convolutional operation device of claim 1, further comprising a weight memory configured to provide a first kernel weight or a second kernel weight to the first MAC array and the second MAC array according to a selection of the input feature map switching network.

5. The convolutional operation device of claim 4, wherein if the input feature map switching network selects the first input feature map registers, the weight memory provides the first kernel weight to the first MAC array and provides the second kernel weight to the second MAC array.

6. The convolutional operation device of claim 5, wherein if the input feature map switching network selects the second input feature map registers, the weight memory provides the first kernel weight to each of the first MAC array and the second MAC array.

7. The convolutional operation device of claim 4, further comprising a weight switching network configured to selectively provide the first kernel weight and the second kernel weight to the first MAC array and the second MAC array.

8. The convolutional operation device of claim 1, wherein the output shift network comprises a register chain configured to shift the output feature map in a zigzag form and transmit the shifted output feature map to the output memory.

9. The convolutional operation device of claim 8, wherein the register chain of the output shift network is changed in arrangement according to a dimension or size of the first and second MAC arrays.

10. The convolutional operation device of claim 1, wherein the input feature map switching network comprises a plurality of multiplexers configured to select any one of first input feature map registers and the second input feature map registers.

11. The convolutional operation device of claim 1, wherein each of the first input feature map registers and the second input feature map registers sequentially shifts an input feature map in a shift direction (left→left→up→right-→right→up→left→left).

12. The convolutional operation device of claim 1, further comprising a controller configured to control the input sharing network, the input feature map switching network, and the output shift network.

* * * * *